Oct. 12, 1937.   G. GORTON   2,095,865
MACHINE TOOL OF THE DUPLICATOR TYPE
Filed May 29, 1936   4 Sheets-Sheet 1

Inventor
George Gorton
By Picks & Peck
Attorneys

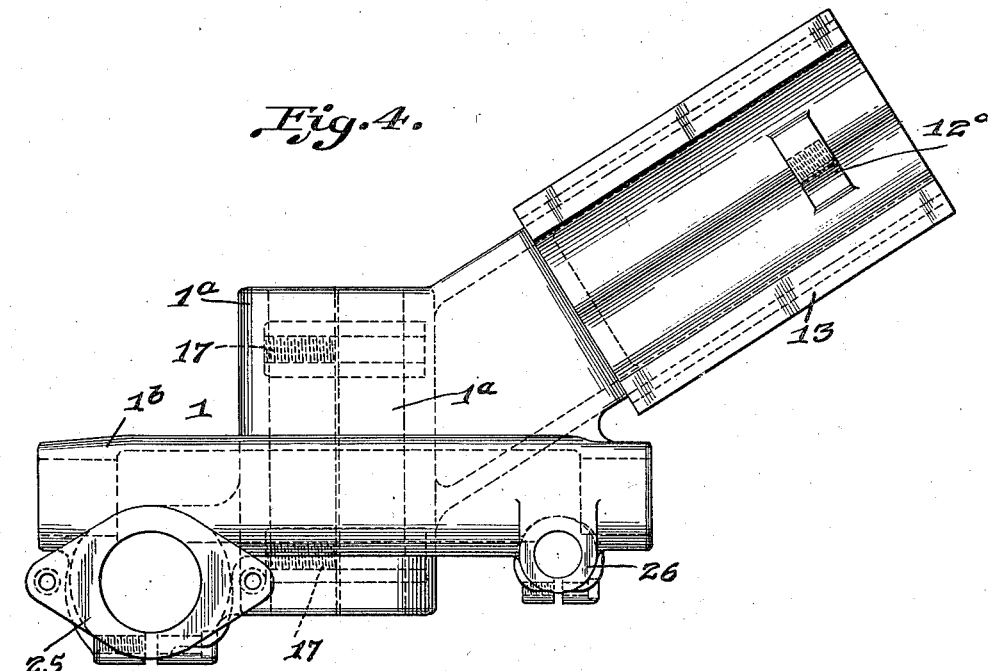
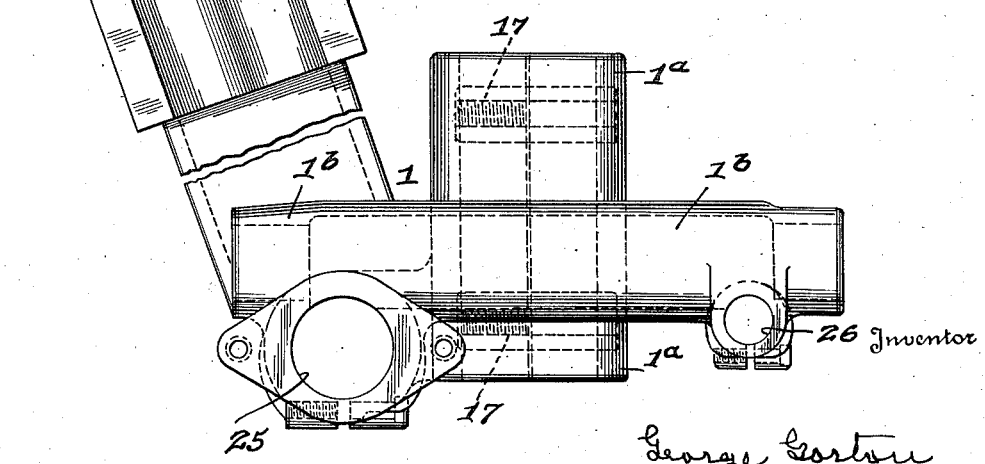

Patented Oct. 12, 1937

2,095,865

UNITED STATES PATENT OFFICE 2,095,865

MACHINE TOOL OF THE DUPLICATOR TYPE

George Gorton, Racine, Wis., assignor to George Gorton Machine Company, Racine, Wis., a corporation of Wisconsin Application May 29, 1936, Serial No. 82,611

4 Claims. (Cl. 90—13.2)

This invention relates to machine tools of the duplicator type; and the objects and nature of the invention will be understood by those skilled in the art in the light of the accompanying drawings that illustrate what I now believe to be the preferred mechanical expression or embodiment of the invention from among other forms and arrangements, within the spirit and scope thereof.

By the expression "duplicator type", I mean a machine tool or other machine capable of duplicating a pattern in full size, as by the use of a tracer to follow or trace the pattern, and a milling or other cutter, to operate on the work under the control of the pattern, where, for instance, the axes of the tracer and cutter are maintained vertical and in normal fixed lateral relationship, and the work and the pattern are maintained in normal fixed lateral relation, and in operative positions to the cutter and pattern, respectively, with provisions for relative vertical and lateral operative movements between the cutter and tracer, as one unit, for instance, and the work and pattern as another unit.

A particular object of the invention is to provide, in such machine of the duplicator type, a novel self-contained compact unit including the tracer and its mountings, the cutter and its mountings, the cutter-driving motor, and a rigid supporting frame, providing means for maintaining the normal fixed lateral spacing of the axes of the cutter and tracer with said axes constantly vertical or perpendicular to the plane or planes of the work and pattern and held against lateral tilting or rocking.

And a further object of the invention is to provide an advantageous self-contained compact comparatively-simple unit including a novel supporting frame carrying the tracer, the cutter, and the cutter-driving motor, adapted for easy application to and removal from standard and other horizontal milling machines particularly those of the over arm type.

With the foregoing and other objects in view, as will be developed hereinafter, my invention consists in certain novel features, structures and arrangements as will be more fully explained and specified hereinafter.

Referring to the accompanying drawings, forming a part hereof:—

Fig. 4 shows the completed unit supporting frame in top plan, before being assembled with the motor, the cutter and its mounting, the tracer and its mounting, and the cross rock shaft for feeding the cutter and tracer to and from operative relation to the work and pattern.

Fig. 5 is a top plan of a modified arrangement of the main frame.

Figure 1:
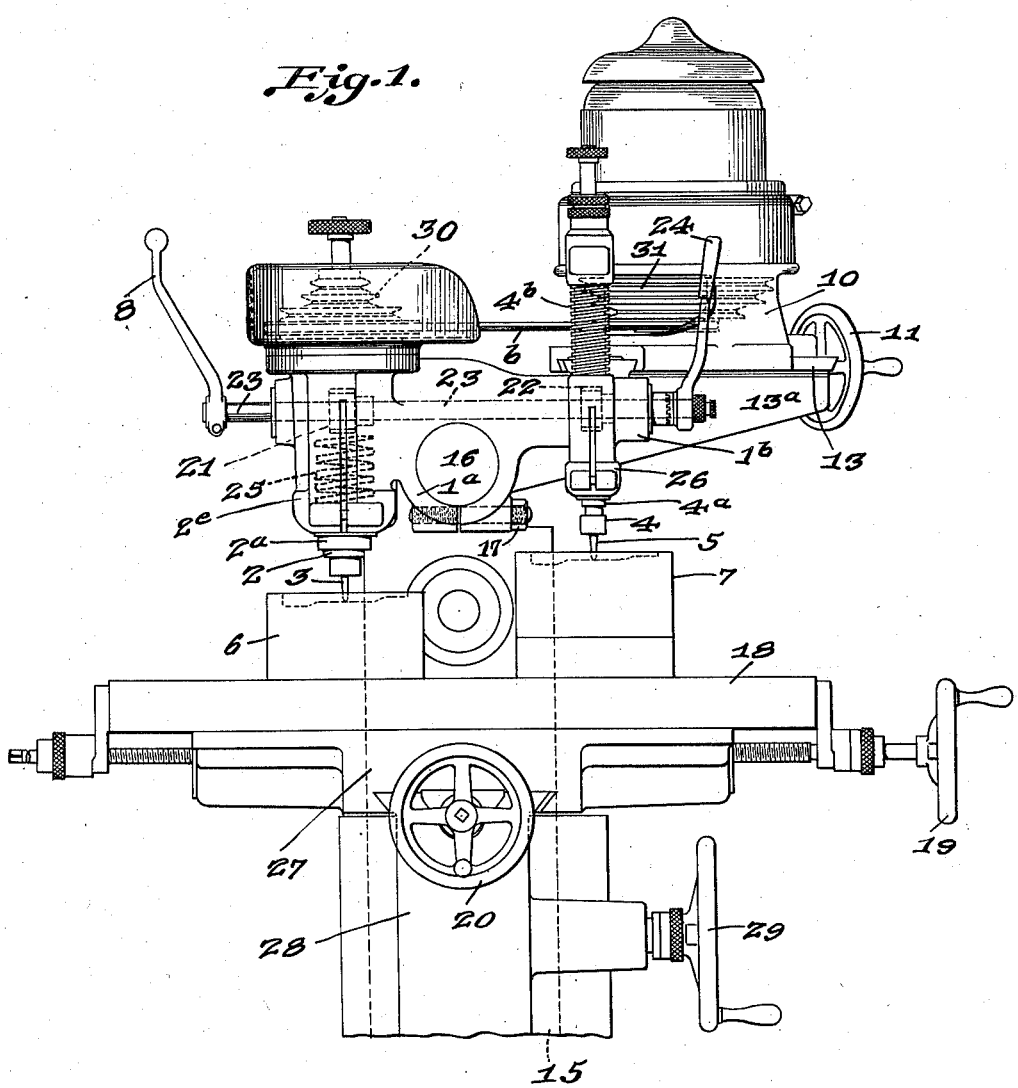
Fig. 1 is a front elevation illustrating, more or less diagrammatically, a standard horizontal milling machine, in part, as an example, including an embodiment of the instant invention, operatively assembled therewith.
Figure 2:
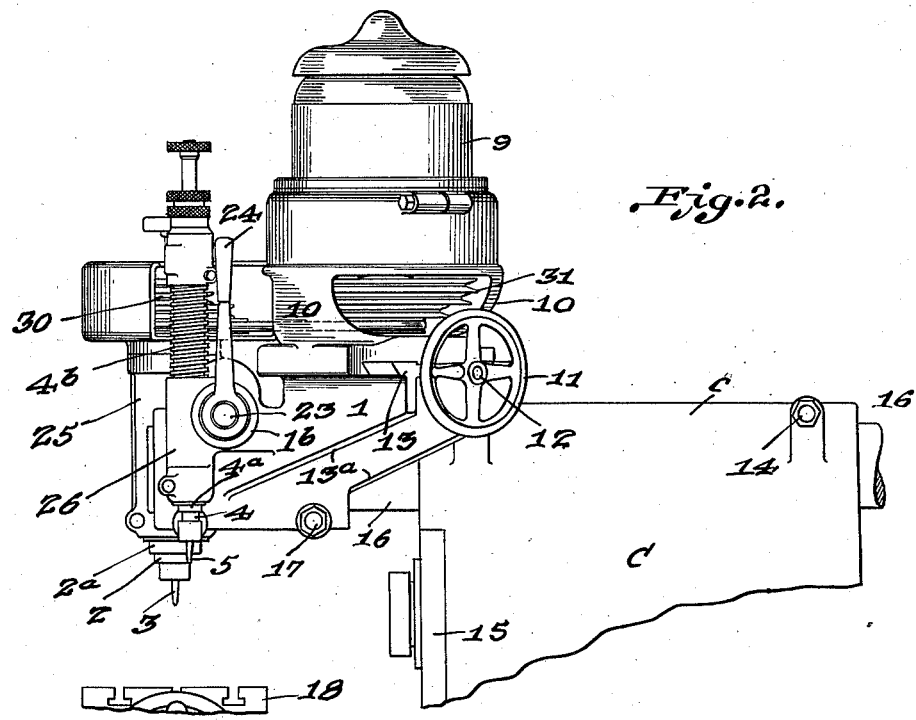
Fig. 2 is the organization of Figure 1, in side elevation.
Figure 3:
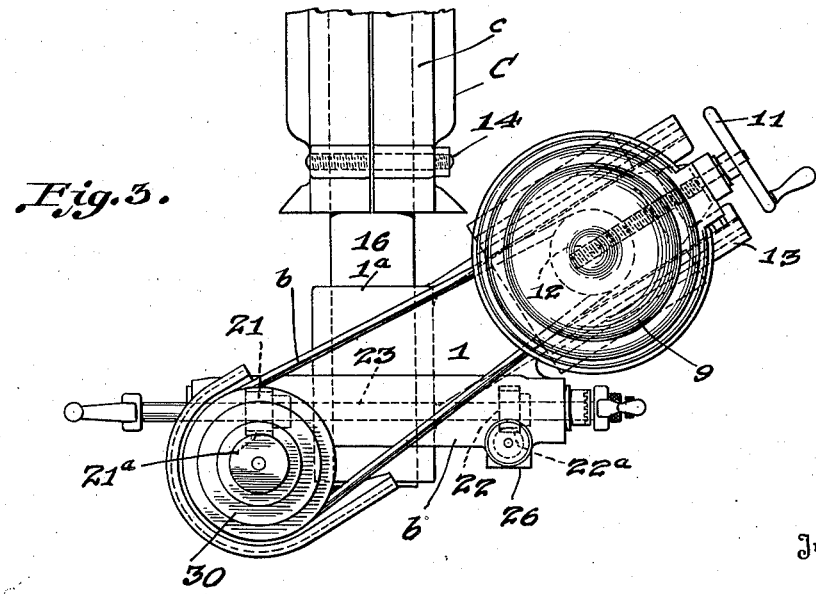
Fig. 3 shows the same in top plan.
Figure 6:
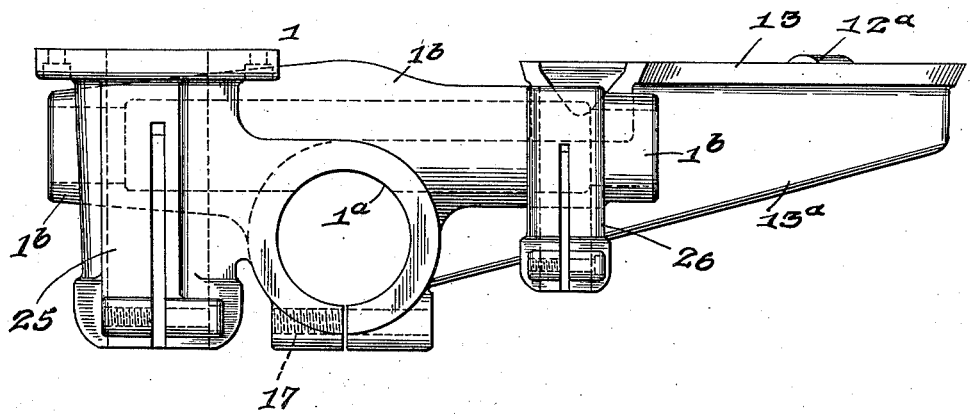
Fig. 6 is a front elevation of said supporting frame of Fig. 4.
Figure 7:
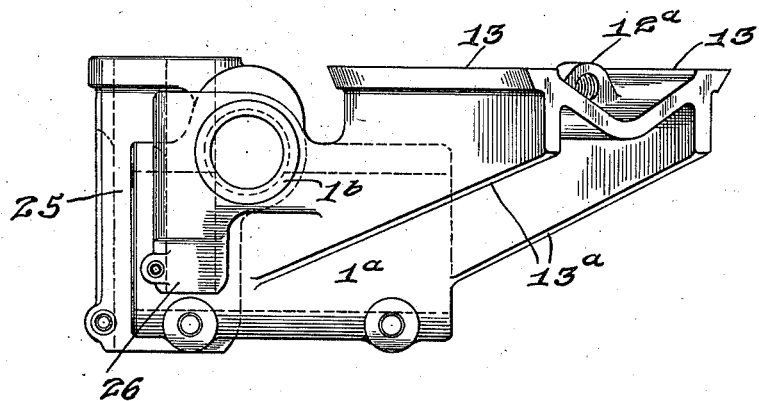
Fig. 7 is an end elevation of said frame of Fig. 6.

As an example of a machine organization from among others, with which the tracing and cutting self-contained unit hereinafter described, can be operatively associated for the purposes of this invention, I more or less diagrammatically illustrate a so-called standard horizontal milling machine.

This machine provides a suitable supporting frame including an upstanding column C, the front side or edge of which provides the guideway 15 for the knee 28. Suitable supporting and adjusting mechanism is provided between the knee and said column, preferably operated by accessible exterior handle 29 whereby the knee can be vertically adjusted on the guideway 15 and held in the vertical position to which adjusted.

This knee carries suitable tables for the work, including the top horizontal work table 18 adjustable through the medium of any suitable mechanism operated by exterior handle 19 for horizontal lengthwise movement and setting of the table 18. This longitudinally adjustable work table 18 is carried by a saddle or other suitable member 27 on which the work table 18 is longitudinally adjustable, and this member 27 is horizontally adjustable forwardly and rearwardly on the knee 28 through the medium of suitable mechanism operated by the front handle 20, or in any suitable manner as common in this art or otherwise.

On this horizontal work table 18, the pattern 7 and the work 6 are adapted to be rigidly clamped in normal fixed spaced relation, as more fully explained hereinafter.

The upper end of the column C forms, preferably as an integral part thereof, a longitudinally split sleeve or socket c, preferably extending from front to rear of the column with a bore extending therethrough from front to rear to receive the horizontally disposed over arm 16, common to this type of milling machine and adapted to be rigidly clamped to the column C by contraction of the split tube or socket c by cross clamp bolts or studs and nuts threaded thereon, all indicated by 14 as common in this art. By loosening the nuts or bolts 14 the forwardly projecting or overhanging horizontal arm 16 can be adjusted longitudinally in the socket c or can be removed therefrom.

The adjustable removable and applicable over arm 16 normally rigidly held to and supported by the column C, projects horizontally forwardly over the work table 18 and the work and pattern thereon and is spaced upwardly a substantial, or the required distance from said work table and the work and pattern thereon, to carry the operating mechanisms for operative association with the work and pattern on the work table.

A compact self-contained tracing and milling or other cutting unit is provided as an attachment, whereby the over arm milling machine can be easily and conveniently converted into a duplicating machine.

This unit provides a cutter head 25 containing the vertically movable quill or slide barrel 2a for and carrying the cutter spindle 2 that is provided with a chuck or collet for replaceably holding the engraving or other cutter 3 designed to operate on the work 6.

This unit also provides a tracer or stylus head 26 for the slide barrel 4a that carries the tracer or stylus spindle 4 carrying the preferably replaceable stylus or tracer 5.

This unit also includes a horizontal cross shaft 23 preferably having at one end a crank or feed handle 8, and at the other end a crank or feed handle 24. These two handles are exposed and accessible from the front at the opposite side ends of the unit, usually or normally upstanding from the shaft 23 and adapted to rock forwardly and downwardly to actuate the shaft to simultaneously and correspondingly downwardly feed the cutter spindle and the stylus spindle through the medium of pinions 21, 22, fixed on the rock shaft 23 and meshing with racks 21a, 22a on the slide barrels 2a, 4a, respectively.

The slide barrels 2a, 4a, are preferably provided with counter-balancing coil expansion springs 2e, 4b, capable of approximately returning the barrels 2a, 4a, and the cutter and tracer carried thereby to their normal elevated positions.

This unit also provides a supporting table and guideway for vertical rotary electric motor 9 and its supporting housing. The cutter spindle 2 is driven and actuated by a suitable belt drive from the motor 9, and this belt drive comprises a preferably cone or stepped belt pulley 30 arranged above the cutter head 25 and operatively connected to the cutter spindle 2 to drive the same. The elevated vertical motor 9 is provided, at the lower end of its motor shaft with a stepped or cone pulley 31 connected to drive the cutter shaft pulley 30 through the medium of any suitable belt b.

Suitable means are provided for bodily adjusting the motor 9 and its housing and supporting base and pulley 31, as a unit toward and from the cutter spindle and its pulley 30 for the purpose of maintaining the driving belt b under the desired tension.

This unit includes a peculiar supporting frame, preferably in the form of a one-piece casting, generally indicated in the drawings by the reference 1.

The shells or housings of the cutter heads 25 and 26 are preferably formed by this frame or casting as integral parts thereof to maintain the fixed lateral spacing of the cutter spindle 2 and the tracer spindle 4 with the longitudinal axes of the cutter spindle and the tracer accurately parallel and fixedly perpendicular to the horizontal plane of the unit, to maintain the longitudinal vertical axes of the cutter spindle and the tracer spindle perpendicular to the horizontal planes of the work and pattern, i. e., perpendicular to the horizontal plane of the work table.

It is an essential characteristic of my invention that the longitudinal axes of the cutter spindle and the tracer spindle are maintained in parallelism for maintenance perpendicular to the planes of the work and pattern.

This supporting frame of the unit also provides as an integral part thereof an elongated tubular portion extending from front to rear thereof and opening unobstructed at both its front and rear ends and usually of uniform internal diameter throughout its length, to longitudinally receive the over arm 16 of the milling machine and to constitute the main supporting structural portion of the unit frame.

This tubular portion 1a is preferably longitudinally split throughout the length of its bottom wall to form a split clamp, and the wall portions of this split clamp along opposite sides of the split or slot are thickened and provided with clamping cross bolts and nuts 17, whereby the split clamp can be contracted to rigidly clamp the over arm 16 or a bushing located fixedly on said arm should a small diameter over arm require the interposition of such bushing.

The split clamp forming tubular portion 1a, of the supporting frame, is preferably depressed with respect to the major remaining portions of the frame and thus located at the lower intermediate portion of the frame between the cutter head 25 and the tracer head 26, with said two heads arranged at the front portions of the supporting frame.

This supporting frame or casting also forms and provides an elongated horizontal tubular portion 1b, arranged transversely of and above the longitudinal axis of the split clamp forming tubular portion 1a, and transversely of and behind the longitudinal axes of the cutter head shell 25 and the tracer head shell 26.

This transverse tubular portion 1b is adapted to carry the bushings or bearings for the rock shaft 23, and said shaft extends longitudinally through said tubular portion 1b and projects from the opposite ends thereof to carry the feed handles 8, 24. This transverse tubular portion 1b also provides the housings for the pinions 21, 22, on said shaft 23 that mesh with the racks on the slide barrels carrying the cutter spindle and the tracer spindle.

This supporting frame or casting of the unit, also provides a rear horizontal supporting arm or table for the motor 9 and its supporting housing and base, preferably located to one side of the front to rear split clamp 1a and to the rear of the transverse tubular portion 1b. This motor support provides a fixed horizontal longitudinally elongated slideway 13, the longitudinal axis of which is preferably perpendicular to and in a common vertical plane with the longitudinal axis of the rotary cutter spindle. The supporting base 10 of the motor preferably is confined to and longitudinally slidable on the slideway 13, and suitable means are provided for moving the motor supporting base and the motor thereon toward and from the rotary cutter spindle axis and for maintaining the motor in the position to which adjusted. Various means can be provided for this purpose although I show a hand wheel 11 rigid with rotary feed screw 12 meshing with fixed nut 12a carried by the fixed portion of the frame forming the slideway 13, the rotary feed screw being operatively coupled to the motor supporting base to move the same in either direction according to the direction of screw rotation.

This motor supporting rear arm or table of the unit supporting frame can be arranged as shown by Fig. 4 of the drawings behind the right-hand end of the tubular portion 1b, or can be arranged as shown by Fig. 5 behind the left-hand portion of the tubular portion 1b and behind the cutter head. Where the motor is arranged as disclosed by Fig. 4 the handle 11 for adjusting the motor is conveniently accessible to the right-hand of the operator standing in front of the duplicating machine. When the motor support is arranged as shown by Fig. 5 of the drawings, the motor adjusting handle 11 is accessible to the left-hand of the operator, and in both instances the motor and its supporting portion of the unit frame, are arranged out of the way and to one side of the machine column C and of the over arm 16.

Whether the motor supporting arm or table of the unit supporting casting is arranged as in Fig. 4 or as in Fig. 5, this arm is preferably formed with longitudinal depending stiffening flanges 13a, that merge into the front to rear tubular portion 1a as well as the transverse tubular portion 1b. This extremely strong and yet very compact frame is designed to clear the column C and to locate the cutter head and the tracer head in accessible unobstructed positions at the front of the unit, preferably with the alternative feed handles 8, 24, in accessible positions at the front of the unit with one or the other of said handles in front of the motor and the motor support, and the clamping nuts and bolts 17 for the front to rear tubular portion 1a located below the unit and its supporting frame and readily accessible from the front.

Although, I do not wish to so restrict my instant invention, the cutter head assembly within the tubular shell 25, can be, if so desired, approximately that disclosed by United States Patent No. 1,889,653, issued to me November 29, 1932, and, if so desired, the stylus or tracer mounting within the tubular shell 26, can be approximately that disclosed by United States Patent No. 2,026,893, issued January 7, 1936 to George Gorton Machine Company, Racine, Wisconsin, as assignee.

The peculiarly advantageous unit supporting stiff rigid frame, generally indicated by the reference numeral 1, rigidly maintains the cutter, stylus, and tubular portions 1a, and 1b, in their respective positions, and in the desired compact arrangement with the driving motor, and with the longitudinal axes of the cutter spindle and stylus in fixed spaced relation and parallel and perpendicular to the longitudinal axes of said tubular portions 1a, 1b, and with the longitudinal axes of said tubular portions perpendicular to each other.

This compact self contained attachment, can be easily applied to and removed from the over arm 16, as a unit, when it is desired to convert the milling machine into a duplicating machine for certain purposes.

The formations of this frame with the rigidly united peculiarly arranged split tubular clamp 1a, cutter head housing 25, tracer housing 26, and tubular transverse portion 1b, as relatively fixed permanent parts thereof, promotes, and, in fact, practically necessitates, accurate assembly of the cutter and tracer mountings in their said respective shells or housings, with respect to each other and the remaining associated parts and the accurate assembly of the rock shaft 23, within its tubular portion 1b.

This peculiar supporting frame maintains the required relative arrangements of the motor with respect to the cutter head assembly, and the required relative arrangements of the cutter and stylus heads, etc. with respect to the main supporting clamp 1a, and of the various parts with respect to adjacent parts of the column C, as well as the over arm 16, when the unit is operatively associated with the described milling machine parts.

The split sleeve supporting clamp 1a, of the duplicating unit, is usually formed with a bore or internal diameter, to receive milling machine over arms 16, of the largest external diameter, hence where it is necessary to apply the same to over arms of smaller diameter, bushings of the required diameter to fit the clamp 1a, are applied.

The fully and operatively equipped duplicating unit, is applied to the milling machine over arm 16, and rigidly clamped thereto by contracting the clamp 1a, thereon by tightening the clamping bolts 17, the over arm having been adjusted to the desired position and rigidly secured by clamping bolts 14.

Any suitable indicating or index marks can be provided on the clamp 1a, the over arm and the adjacent end of the column clamp c, or other method or means can be employed, to make sure that the duplicating unit when in finally secured operative relation to the work table, is in the desired horizontal level position with the axes of its cutter and spindle accurately perpendicular to the horizontal plane of the work table and to the horizontal planes in which the tracer and the cutter are to work on the pattern and the work, secured in fixed spaced relation on the work table, under the tracer and the cutter, respectively.

When the duplicator unit is thus operatively fixed on the milling machine and the pattern and work are operatively fixed on the work table, the operator can vertically adjust the knee 28, to bring the pattern and work into operative relation with the tracer and cutter, and thereupon the operator can control the depth tracing and cutting relation between the tracer and pattern and cutter and work, by grasping either one or the other feed handles 8 or 24, and swinging the same forwardly and downwardly and thereby simultaneously and correspondingly feed down the tracer and cutter and yieldingly hold the same down to the pattern and work, and accurately and nicely control the operation by the "feel" of the operating cutter. This is preferable to controlling the depth tracing and cutting by vertically moving the knee through handle 29.

The lateral dimensional tracing and cutting can be controlled by manipulation of the work table feed handles 19 and 20, to simultaneously universally laterally move the pattern and work with respect to the laterally fixed tracer and cutter.

This temporary assembly of a milling machine with this duplicator unit attachment, is adapted for accurately performing certain kinds or types of duplicator work, and after completion of the duplicator work, the unit attachment can be easily removed, and the milling machine thus can be restored to condition for performing its regular milling work.

If so desired, the hollow supporting base 10, that carries the elevated motor 9, can form a guard 10a, for the driving belt, and a belt guard 25b, can also be mounted on the unit supporting frame 1, at the top of cutter head 25.

Obviously, the hand actuated feed mechanism for the cutter and tracer, can, if so desired, be equipped with one controlling handle, and, in fact, I do not wish to limit my invention to any particular species of feed or vertical adjusting means for the tracer and cutter, nor to any particular motor arrangement and belt tightening means, if any, or the tracer and tracer mounting species disclosed herein or by the aforementioned patents.

What I claim is:—

1. In a machine tool having a column, a longitudinally and laterally adjustable work table, and an over arm carried by said column and horizontally overhanging said work table; a self-contained duplicator unit provided with a cutter head having a vertical rotary cutter spindle, a tracer head having a vertical tracer, a motor for driving the cutter spindle, and a supporting frame for said heads and motor, maintaining said heads in fixed laterally spaced relation with the longitudinal axes of said cutter spindle and tracer in fixed parallel relation and against lateral tilting or inclination, said frame including as rigid parts thereof, a main supporting socket for securing on said over arm and vertical tubular shells forming the housings of said cutter and tracer heads, said housings being arranged at the front of said frame and on opposite sides of said socket.

2. A duplicator unit attachment for a machine tool having a laterally and longitudinally adjustable horizontal work table, and a top horizontal support over-hanging said table; said attachment including a supporting frame providing a split-sleeve-clamp-forming tubular portion for securing on said overhanging support, and a transverse tubular portion, and front laterally-spaced vertical tubular shells, said tubular portions and said shells forming fixedly-located permanent parts of said frame, a longitudinally feedable vertical cutter spindle and its mountings arranged in one of said shells, a longitudinally feedable vertical tracer and its mountings carried by the other shell, said shells maintaining said spindle and tracer in fixed laterally spaced relation against lateral inclination and at the front of said frame, and a rock shaft arranged in said transverse tubular portion and operatively coupled to simultaneously longitudinally feed said cutter spindle and said tracer and provided with accessible manual controlling means.

3. A duplicator attachment unit, comprising a rotary cutter spindle and its mounting; a tracer and its mounting; a motor and its base; a belt drive from the motor to the cutter spindle; and a frame carrying said parts and forming a main supporting expansible and contractile tubular portion provided with contracting means, said frame including a portion rigid with and transversely arranged with respect to said tubular portion and provided with formations maintaining said cutter spindle and its mounting and said tracer and its mounting in fixed lateral spaced relation with respect to each other and said tubular portion with the longitudinal axes of said spindle and said tracer parallel and perpendicular to the plane of the longitudinal axis of said tubular portion; said frame also including a motor supporting slideway fixed with respect to said tubular portion and formations and laterally offset from said tubular portion and arranged to the rear of said formations, said motor base being confined to said slideway, and provided with means to adjust the same longitudinally thereof.

4. A duplicator attachment applicable as a unit to, and removable from, a machine tool to operatively overhang the work table thereof; said attachment including a single substantially one-piece supporting frame having a main supporting intermediate portion, a front transversely arranged portion, and a supporting portion for a cutter driving motor, said last named portion being arranged behind said transverse portion and laterally-offset with respect to said main supporting portion, the vertical plane of the longitudinal axis of said main supporting portion being substantially perpendicular to and intersecting the vertical plane of the longitudinal axis of said transverse portion; a cutter head; and a tracer head, both carried and fixedly held by said single frame against relative lateral tilting or inclination, and arranged at the front of said front transverse portion.

GEORGE GORTON.